US009528631B2

(12) United States Patent
McCarty

(10) Patent No.: US 9,528,631 B2
(45) Date of Patent: Dec. 27, 2016

(54) GAS PRESSURIZED PACKING SYSTEM FOR CONTROL VALVES

(71) Applicant: FISHER CONTROLS INTERNATIONAL LLC, Marshalltown, IA (US)

(72) Inventor: Michael Wildie McCarty, Marshalltown, IA (US)

(73) Assignee: FISHER CONTROLS INTERNATIONAL LLC, Marshaltown, IA (US)

( * ) Notice: Subject to any disclaimer, the term of this patent is extended or adjusted under 35 U.S.C. 154(b) by 100 days.

(21) Appl. No.: 14/519,603

(22) Filed: Oct. 21, 2014

(65) Prior Publication Data

US 2016/0109035 A1  Apr. 21, 2016

(51) Int. Cl.
| F16K 41/02 | (2006.01) |
| F16K 1/36 | (2006.01) |
| F16K 31/44 | (2006.01) |
| F16K 27/02 | (2006.01) |
| F16K 41/00 | (2006.01) |

(52) U.S. Cl.
CPC ............ *F16K 41/02* (2013.01); *F16K 1/36* (2013.01); *F16K 27/02* (2013.01); *F16K 31/445* (2013.01); *F16K 41/003* (2013.01)

(58) Field of Classification Search
CPC ........ F16K 41/02; F16K 31/445; F16K 27/02; F16K 1/36; F16K 41/003; F16K 41/06
USPC .................. 251/214; 277/318, 320; 137/312
See application file for complete search history.

(56) References Cited

U.S. PATENT DOCUMENTS

| 574,353 | A | * | 12/1896 | Garlock | F16J 15/183 |
| | | | | | 277/516 |
| 2,065,637 | A | * | 12/1936 | Williams | F16K 41/003 |
| | | | | | 251/214 |
| 3,206,165 | A | * | 9/1965 | Salmon | F16K 41/10 |
| | | | | | 251/214 |
| 3,295,856 | A | * | 1/1967 | Bredtschneider | F16K 41/02 |
| | | | | | 251/214 |
| 3,434,728 | A | * | 3/1969 | Soldato | F16J 15/185 |
| | | | | | 277/516 |
| 3,529,805 | A | * | 9/1970 | Callahan, Jr. | F16K 1/14 |
| | | | | | 251/214 |
| 3,907,307 | A | | 9/1975 | Maurer et al. | |
| 4,177,998 | A | | 12/1979 | Laitkep et al. | |

(Continued)

OTHER PUBLICATIONS

International Search Report and Written Opinion issued on Jan. 26, 2016 in counterpart International Patent Application No. PCT/US2015/056621.

*Primary Examiner* — John Bastianelli
(74) *Attorney, Agent, or Firm* — Marshall, Gerstein & Borun LLP

(57) ABSTRACT

A gas pressurized packing system for use in a control valve may include a first packing member, a second packing member and a pressurized gas supply. The first and second packing members may be arranged about, respectively, lower and upper portions of an operating member that extends through a bore in the control valve. The pressurized gas supply may be configured to pressurize a portion of the bore arranged between the first and second packing members. The gas pressurized packing system may be implemented in a low fugitive emission control valve and a low fugitive emission control valve system.

15 Claims, 3 Drawing Sheets

(56) References Cited

U.S. PATENT DOCUMENTS

| | | | | |
|---|---|---|---|---|
| 4,340,204 A | * | 7/1982 | Herd | F16K 3/36 |
| | | | | 251/214 |
| 4,364,542 A | | 12/1982 | Meyer | |
| 4,575,101 A | * | 3/1986 | Hopkins | F16J 15/181 |
| | | | | 137/246.16 |
| 5,085,443 A | | 2/1992 | Richards | |
| 5,129,624 A | * | 7/1992 | Icenhower | F16K 5/0285 |
| | | | | 137/246.22 |
| 5,244,183 A | | 9/1993 | Calvin et al. | |
| 5,372,352 A | * | 12/1994 | Smith | F16J 15/004 |
| | | | | 251/214 |
| 5,607,165 A | * | 3/1997 | Bredemeyer | F16J 15/406 |
| | | | | 277/320 |
| 5,732,731 A | * | 3/1998 | Wafer | F16K 41/023 |
| | | | | 137/312 |
| 6,763,703 B2 | * | 7/2004 | Krieger | G01M 3/2876 |
| | | | | 73/46 |
| 7,118,114 B2 | * | 10/2006 | Burdick | F16J 15/004 |
| | | | | 277/510 |
| 2013/0061954 A1 | | 3/2013 | Giove et al. | |

* cited by examiner

GAS PRESSURIZED PACKING SYSTEM FOR CONTROL VALVES

FIELD OF DISCLOSURE

The present application relates generally to control valves, and, more particularly, to a packing assembly for use in a control valve to limit fugitive emissions.

BACKGROUND OF THE DISCLOSURE

Control valves are used in a wide variety of applications including process plants such as refineries, chemical plants, and paper plants, among many others. Control valves typically employ a control member such as a valve plug, a valve disc or other suitable control member, to manipulate a process fluid or gas flowing through a pipeline, such as a steam, water, natural gas, oil or a chemical compound. The control member is typically moved by an operating member, such as a sliding valve stem or a rotary shaft, that extends through a bore in the valve body. To prevent leakage or fugitive emissions of the process fluid or gas around the operating member, packing material is typically arranged about the operating member in the bore.

Many process applications, such as those involving aromatic or chlorinated hydrocarbons, utilize control valves that have a tendency to leak small amounts of process into the surrounding environment. Regulations governing control valve leakage have become more stringent in recent times, and in some applications, require fugitive emission concentrations to be less than 100 parts per million by volume (ppmv). Typical solutions to reduce fugitive emissions involve placing a metal bellows seal around the operating member to capture process leakage and/or exerting additional compressive stress on the packing material to create a tighter seal between the operating member and the valve body bore. However, these solutions can have undesirable effects on the operation and performance of the control valve. For instance, increasing the packing stress tends to increase the friction experienced by the operating member. The increased friction impedes movement of the operating member, which, in turn, can make it difficult to monitor and control the position of the control member. Higher levels of friction also may necessitate a larger actuator, which can increase the operating and manufacturing costs associated with the control valve. Furthermore, a metal bellows seal tends to be expensive to install, may require regular field maintenance and/or replacement, and/or may limit the travel distance of the operating member.

Thus, it is desired to provide a packing assembly for control valves which exhibits nearly zero fugitive emissions, low friction, long service life and reasonable cost.

SUMMARY OF THE DISCLOSURE

In accordance with a first exemplary aspect, a low fugitive emission control valve includes a valve body, a bonnet, an operating member, first and second packing members, a gas supply port and a pressurized gas supply. The valve body includes an inlet, an outlet and a flow passage extending between the inlet and the outlet. The bonnet is mounted to the valve body and has a bore that opens into the valve body. The operating member extends through the bore and is operatively connected to a control member arranged in the flow passage. The operating member is configured to move the control member between a closed position and an open position to open and close the flow passage. The first packing member is arranged in the bore about a lower portion of the operating member. The second packing member is arranged in the bore about an upper portion of the operating member. The gas supply port extends through the bonnet and opens into the bore at a location between the first packing member and the second packing member. The pressurized gas supply is configured to pressurize the bore via the gas supply port to inhibit fugitive emissions.

In accordance with a second exemplary aspect, a gas pressurized packing system is provided for use in a control valve including a valve body with a flow passage, a bonnet mounted to the valve body, a bore extending through the bonnet and opening into the valve body, an operating member extending through the bore and operatively connected to a control member arranged in the flow passage. The gas pressurized includes a first packing member, a second packing member and a pressurized gas supply. The first packing member is configured to be arranged in the bore about a lower portion of the operating member. The second packing member is configured to be arranged in the bore about an upper portion of the operating member. The pressurized gas supply is configured to pressurize a portion of the bore arranged between the first plurality of packing rings and the second plurality of packing rings.

In accordance with a third exemplary aspect, low fugitive emission control valve system includes a plurality of control valves and a pressurized gas supply line. Each of the control valves includes a valve body possessing an inlet, an outlet and a flow passage extending between the inlet and the outlet. Each of the control valves also includes a bonnet mounted to the valve body and having a bore that opens into the valve body. Each of the control valves further includes an operating member extending through the bore and operatively connected to a control member arranged in the flow passage, with the operating member being configured to move the control member between a closed position and an open position to open and close the flow passage. Additionally, each of the control valves includes a first packing member arranged in the bore about a lower portion of the operating member and a second packing member arranged in the bore about an upper portion of the operating member. The pressurized gas supply line is configured to pressurize the bores of the control valves via the respective gas supply ports.

In further accordance with any one or more of the foregoing first, second or third aspects, low fugitive emission control valve, a gas pressurized packing system and/or a low fugitive emission control valve system any further include any one or more of the following preferred forms.

In one preferred form, a pressure of the pressurized gas supply is greater than or equal to a pressure of a process fluid or gas in the flow passage In one preferred form, the first packing member includes a first plurality of packing rings and the second packing member includes a second plurality of packing rings.

In one preferred form, the first plurality of packing rings has a V-shaped cross-section pointing in a downward direction, and the second plurality of packing rings has a V-shaped cross-section pointing in an upward direction.

In one preferred form, a check valve is arranged in the gas supply port.

In one preferred form, the pressurized gas supply includes a pressurized gas canister connected to the check valve.

In one preferred form, the pressurized gas supply includes a pressurized gas supply line that delivers pressurized gas from an external source.

In one preferred form, a lantern ring is arranged in the bore about a middle portion of the operating member between the first packing member and the second packing member.

In one preferred form, a middle portion of the lantern ring has a reduced diameter, and the gas supply port is aligned with the middle portion of the lantern ring.

In one preferred form, the operating member includes a valve stem slidable along an axis of the bore to move the control member between the open position and the closed position.

In one preferred form, the operating member includes a rotatable shaft to move the control member between the open position and the closed position.

In one preferred form, the pressure of the pressurized gas supply is greater than or equal to a pressure of a process fluid or gas in the flow passage.

In one preferred form, the first plurality of packing rings has a V-shaped cross-section pointing in a downward direction, and the second plurality of packing rings has a V-shaped cross-section pointing in an upward direction.

In one preferred form, the pressurized gas supply includes a pressurized gas canister.

In one preferred form, a lantern ring is configured to be arranged in the bore about a middle portion of the operating member between the first plurality of packing rings and the second plurality of packing rings.

In one preferred form, a pressure of the pressurized gas supply is greater than or equal to a pressure of a process fluid or gas in the flow passages of each of the control valves.

In one preferred form, the first packing member of at least one of the control valves includes a first plurality of packing rings and the second packing member of the at least one control valve includes a second plurality of packing rings In one preferred form, the first plurality of packing rings has a V-shaped cross-section pointing in a downward direction, and the second plurality of packing rings has a V-shaped cross-section pointing in an upward direction.

DETAILED DESCRIPTION

Figure 1:
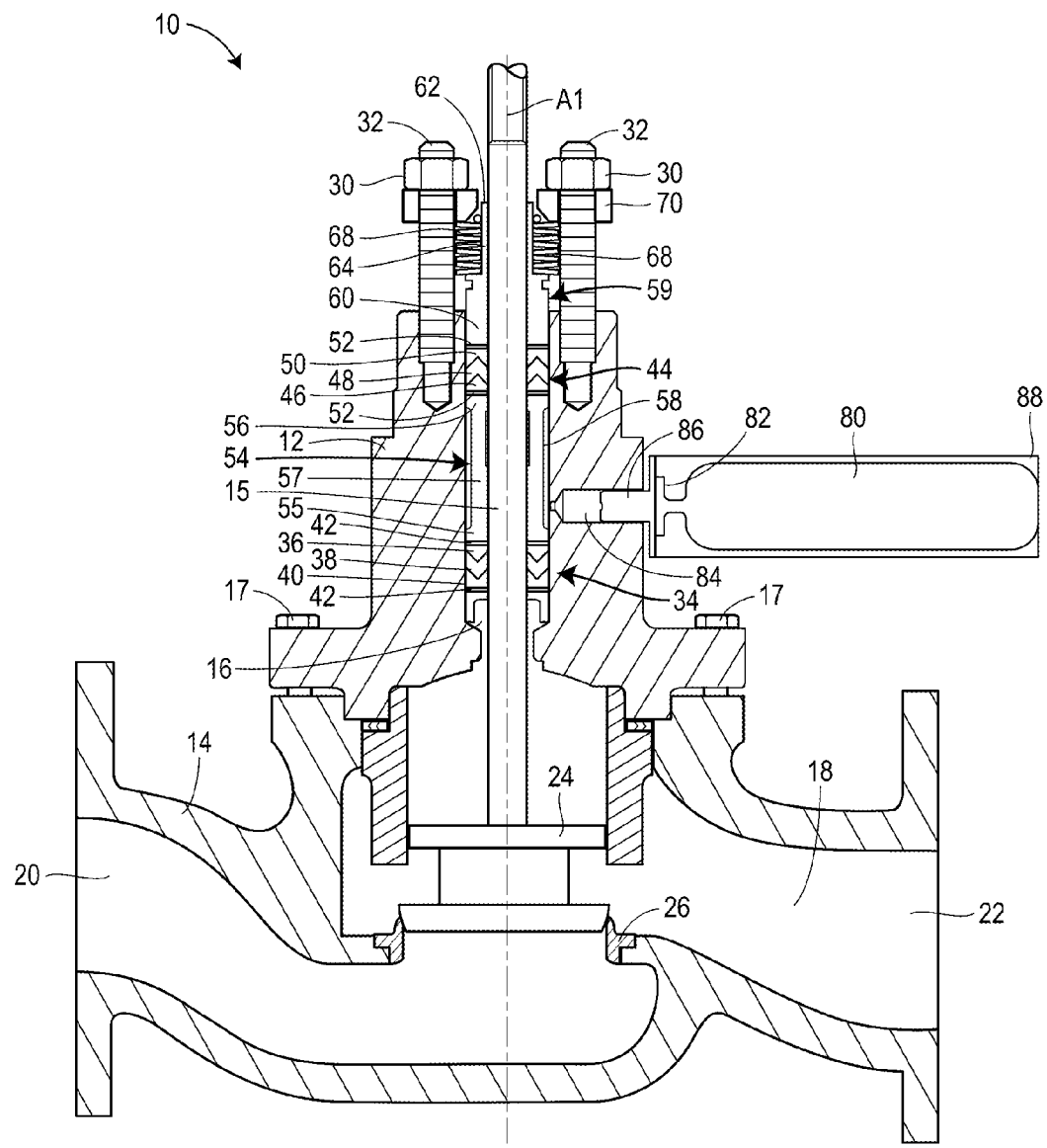
FIG. 1 is a cross-sectional view of an embodiment of a control valve of a sliding stem type constructed in accordance with principles of the present disclosure.

The principles of the present disclosure are applicable to various types of control valves, such as sliding stem control valves and rotary shaft control valves, as well as, various packing arrangements, such as jam-style or live-loaded, and various packing materials, such as polytetrafluoroethylene (PTFE) and graphite. FIG. 1 illustrates, for instance, a control valve 10 of the sliding stem type, having a live-loaded packing arrangement and PTFE packing rings, which incorporates a gas pressurized packing system in accordance with principles of the present disclosure.

The illustrated portion of the control valve 10 includes a bonnet 12 mounted on a valve body 14 and an operating member, such as sliding stem 15, that extends through a bore 16 formed in the bonnet 12. Fasteners 17 may be used to removably secure the bonnet 12 to the valve body 14. A flow passage 18 extends through the valve body 14 between an inlet 20 and an outlet 22 and provides a path for a process liquid or gas to flow through the control valve 10. The process liquid or gas may be any fluid or gas, including, but not limited to, steam, water, natural gas, oil and/or a chemical compound. The flow passage 18 is opened and closed by a control member 24 which is movable by the operating member 15 between a closed position and an open position. In the closed position, as shown in FIG. 1, the control member 24 sealingly engages a valve seat 26 to prevent the process fluid or gas from passing through the control valve 10. In the open position, the control member 24 is raised from the valve seat 26 to allow the process fluid or gas to pass from the inlet 20 to the outlet 22. Movement of the control member 24 is accomplished by coupling the control member 24, by way of the sliding stem 15, to an actuator (not shown). The actuator moves the sliding stem 15 linearly along an axis A1 of the bore 16 in the upward and downward directions, thereby causing the control member 24 to move between the open and closed positions, as well as other intermediate positions.

In one embodiment, the control valve 10 is provided with a double V-ring, live-loaded packing arrangement, such as the Enviro-Seal® PTFE packing from Fisher Controls International LLC of Marshalltown, Iowa. Referring to FIG. 1, the packing arrangement includes a series of packing nuts 30 which are threadably mounted on respective packing studs 32 so as to adjust the loading on the packing within the bore 16 and around the sliding stem 15. A first packing ring set 34 is arranged in the bore 16 about a lower portion of the sliding stem 15. The first packing ring set 34 includes three V-rings including a bottom female adapter V-ring 36, a middle V-ring 38, and an upper male adapter V-ring 40. The V-type packing rings 36, 38, 40 may be formed of a PTFE material, or any other suitable synthetic resin polymer. A respective carbon bushing 42 may be provided at each end of the first packing ring set 34.

A second packing ring set 44 is arranged in the bore 16 about an upper portion of the sliding stem 15. The second packing ring set 44 includes three V-rings having an upper female adapter V-ring 46, a middle V-ring 48, and a lower male adapter V-ring 50. The V-type packing rings 46, 48, 50 may be formed of a PTFE material, or another suitable synthetic resin polymer. A respective carbon bushing 52 may be provided at each end of the second packing ring set 44.

As illustrated in FIG. 1, the V-type packing rings 36, 38, 40 associated with the first packing ring set 34 may have a V-shaped cross section that points in the downward direction, whereas the V-type packing rings 46, 48, 50 associated with the second packing ring set 44 may have a V-shaped cross section that points in the upward direction. As discussed in more detail below, this arrangement of the V-type packing rings may, in some cases, help the pressurized air introduced into the bore 16 compress the V-type packing rings 36, 38, 40 in a manner that seals the bore 16. In an alternative embodiment, all of the V-type packing rings 36, 38, 40, 46, 48, 50 may have a V-shaped cross section the points in the upward direction (or the downward direction).

A lantern ring 54 is placed around the sliding stem 15 in the bore 16 between the first packing set 34 and the second packing set 44. The lantern ring 54 has a first end 55, a second end 56 and a middle portion 57 extending between the first end 55 and the second end 56. The middle portion 57 possesses a reduced diameter relative to the first and second ends 55, 56. The diameter of the middle portion 57 may be less than the diameter of the bore 16 so that an annular gap 58 exists between the middle portion 57 of the lantern ring 54 and the inner wall of the bore 16. As further described below, this annular gap 58 may be pressurized via an external pressurized air supply to help prevent fugitive emissions.

The live-loaded packing arrangement also includes a packing follower 59 having a follower base 60 at one end, a follower guide sleeve 62 at the other end, and a follower flange 64 extending between the follower base 60 and the follower guide sleeve 62. A series of disk springs 68, such as Belleville springs, are slidably mounted on the follower guide sleeve 52 with one end of the disk springs 68 in contact with the follower flange 64 and the other end of the disk springs 68 in contact with a packing flange 70. The packing studs 32 and sliding stem 15 pass through respective apertures in the packing flange 70.

After assembling the packing components within the bore 16 and around the sliding stem 15, the packing nuts 30 on the studs 32 are tightened so that the packing flange 70 transmits the nut load to the disk springs 68. The disk springs 68 compress with continued tightening of the packing nuts 30 so as to maintain a spring load on the first and second packing ring sets 34, 44 by way of the packing follower 59. The compression of the V-shaped rings 36, 38, 40, 46, 48, 50 causes them to flatten and sealingly engage the sliding stem 15 and the inner wall of the bore 16. The increased pressure between the V-shaped rings 36, 38, 40, 46, 48, 50 and the sliding stem 15 creates friction that inhibits axial movement of the sliding stem 15. Therefore, additional compression of the V-shaped shaped rings 36, 38, 40, 46, 48, 50 increases the effectiveness of seal, but also increases friction on the sliding stem 15, which may impact the dynamic performance of the control valve 10.

The control valve 10 of the present disclosure is configurable with a pressurized gas supply such as the pressurized gas canister 80 illustrated in FIG. 1. The pressurized gas canister 80 is mounted to the exterior of the bonnet 12 and includes a discharge nozzle 82 communicable with a gas supply port 84 extending through the bonnet 12. The gas supply port 84 may be a passageway that extends between the bore 16 and the exterior of the bonnet 12 such that one end of the gas supply port 84 opens into the bore 16 and the other end of the gas supply port 84 opens exteriorly of the control valve 10. The end of the gas supply port 84 opening into the bore 16 may be positioned, in the axial direction, between the first packing ring set 34 and the second packing ring set 44. Additionally, the gas supply port 84 may be aligned with the middle portion 57 of the lantern ring 54 such that the gas supply port 84 communicates directly with the annular gap 58 defined by the reduced-diameter middle portion 57 of the lantern ring 54.

In some cases, it may be possible to utilize a pre-existing lubrication port of the control valve as the gas supply port 84. Lubrication ports are found on many control valves for the purpose of introducing lubricant into the bore to reduce the sliding friction between the sliding stem and the packing rings. Accordingly, some control valves may be outfitted with a pressurized gas supply in accordance with principles of the present disclosure without substantially altering the design or configuration of the control valve.

A check valve 86 may be arranged in the gas supply port 84 to permit the flow of gas into the bore 16 and inhibit the flow of gas out of the bore 16. The discharge nozzle 82 of the pressurized gas canister 80 may be removably attached to the check valve 86 as illustrated in FIG. 1. In one embodiment, the discharge nozzle 82 and the check valve 86 may form a quick-disconnect fitting. By locating the pressurized gas supply canister 80 on the exterior of the control valve 10, it may be possible to replace the pressurized gas supply canister 80 without disassembling the entire control valve 10. To protect the pressurized gas canister 80 from damage and exterior elements, the pressurized gas canister 80 may be housed within a gas cartridge shell 88.

In use, the pressurized gas canister 80 supplies pressurized gas to the portion of the bore 16 located between the first packing ring set 34 and the second packing ring set 44. In the embodiment depicted in FIG. 1, the pressurized portion of the bore 16 includes the annular gap 58 formed between the reduced-diameter middle portion 57 of the lantern ring 54 and the inner wall of the bore 16. The pressurized gas in the bore 16 provides a gas curtain or blanket that inhibits the leakage of the process liquid or gas past the first packing ring set 34. The pressurized gas in the bore 16 exerts a force that pushes any process liquid or gas attempting to leak past the first packing ring set 34 back into the flow passage 18. Accordingly, the pressurized gas inhibits fugitive emissions from the control valve 10, and does so without exerting substantial additional compressive forces on the first and second packing ring sets 34, 44. The additional sealing provided by the pressurized gas supply also reduces the need to overly tighten the packing nuts 30 on the studs 32. As a result, proper sealing may be achieved without the undesirable friction associated with severely tightening the packing nuts 30. Accordingly, the pressurized air supply helps preserve the dynamic performance of the control valve 10.

In one embodiment, the pressurized gas provided by the pressurized gas supply is an inert gas such as carbon dioxide or any other suitable gas. The use an inert gas decreases the likelihood of the pressurized gas chemically altering the process fluid or gas flowing through the control valve 10 in the event that the pressurized gas leaks past the first packing ring set 34 and into the flow passage 18. Additionally, an inert gas may not be considered a fugitive emission subject to governmental regulation should the inert gas leak past the second packing ring set 44 and into the atmosphere. In one embodiment, the pressurized gas acts as a lubricant that reduces friction between the sliding stem 15 and the first and second packing ring sets 34, 44.

In one embodiment, the initial mass of the pressurized gas included in the pressurized gas canister 80 is equal to approximately (e.g., ±10%) 12 grams, or lesser or greater. This quantity of pressurized gas, when used in combination with valve packing compressed to an ISO 15848-1 Class C tightness of $1 \times 10^{-2}$ mg/(s*m), results in an operating life of the pressurized gas canister of approximately (e.g., ±10%) 3.16 years. If used with valve packing compressed to an ISO 15848-1 Class B tightness, a 12 gram pressurized gas canister may, in theory, be able to provide pressure for over 300 years. Accordingly, a relatively small pressurized gas canister can provide sufficient pressure to seal the control valve for a substantial duration of time.

The pressure of the pressurized gas supply may be selected based on the pressure of the process fluid or gas flowing through the control valve. In some embodiments, the pressure of the pressurized gas supply is greater than or equal to the pressure of the process fluid or gas flowing through the flow passage 18 of the control valve 10. In one embodiment, the pressure of the pressurized gas supply may be in a range between approximately (e.g., ±10%) 50-5000 psi, for example, between 200-2000 psi, and, for example, between 500-1000 psi. In one embodiment, the pressurized gas supply may be an off-the-shelf pressurized gas cartridge (e.g., a $CO_2$ cartridge) having a pressure of approximately (e.g., ±10%) 800 psi.

As mentioned above, the V-shaped rings 38, 40, 42 of the first packing ring set 34 may be configured in the bore 16 such that the V-shaped cross section points in the downward direction toward the flow passage 18 and away from the second packing ring set 44. This configuration of the first packing ring set 34 may help direct the force of the pressurized gas in the downward direction so that the pressurized gas pushes any process liquid or gas that seeps into the V-shaped rings 38, 40, 42 back into the flow passage 18. Other embodiments can be arranged differently, for example, with the V-shaped rings 38, 40, 42 pointing in the upward direction, for example, to facilitate high levels of compression provided by the packing nuts 30.

While the pressurized gas supply of the present embodiment is disclosed as being a pressurized gas canister, alternative embodiments could be arranged differently, for example, with the pressurized gas supply being a pressurized gas supply line that receives pressurized gas from an external pump (not illustrated). In one embodiment, the pressurized gas supply may tap into a source of pressurized air that supplies working pressure to many different devices in an industrial facility.

Figure 2:
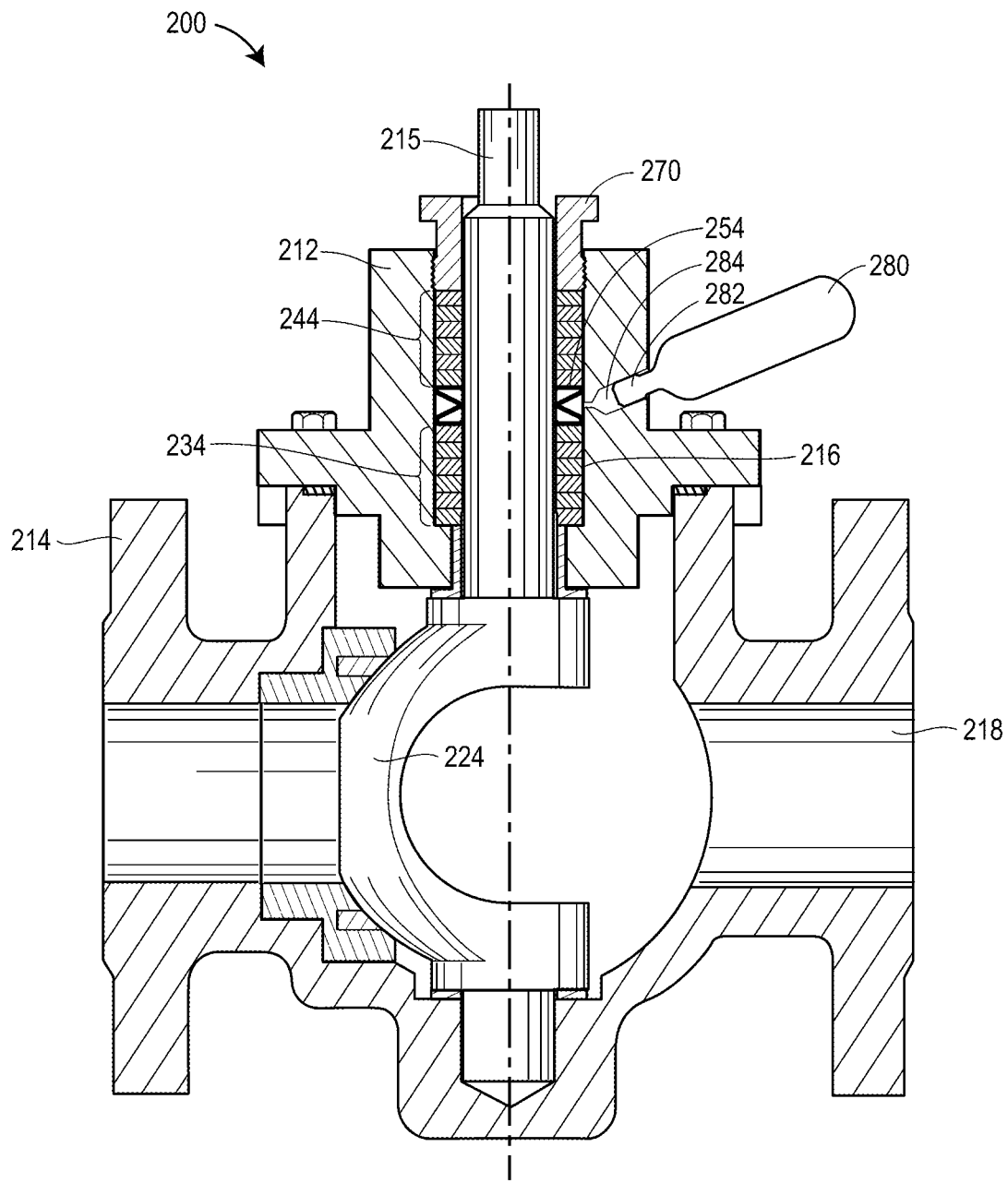
FIG. 2 is a cross-sectional view of an embodiment of a control valve of a rotary shaft type constructed in accordance with principles of the present disclosure.

The pressurized gas supply of the present disclosure may be implemented in a variety of different control valves and used with a variety of different types of packing materials. FIG. 2 illustrates a control valve 210 including a rotating shaft 215 that extends through a bore 216 formed in a bonnet 212. A valve body 214 is fastened to the bonnet 212 and includes a flow passage 218 for a process fluid or gas. The rotating shaft 215 moves a control member 224 between an open position and a closed position to control the flow of process through the control valve 210. To seal the rotating shaft 215 within the bore 216, the control valve 210 utilizes a statically-loaded packing arrangement including a first packing ring set 234 and a second packing ring set 244. A threaded packing flange 70 is screwed into the top end of the bore 216 to apply a static load to the first and second packing ring sets 234, 244. Each of the first and second packing ring set 234, 244 is comprised of one or more graphite rings. Between the first and second packing ring sets 234, 244 is a lantern ring 254. In one embodiment, the lantern ring 254 is configured in the same manner as the lantern ring 54 mentioned above, including a reduced-diameter middle portion that defines an annular gap between the lantern ring 254 and the inner wall of the bore 216.

The control valve 210 includes a gas supply port 284 extending between the bore 216 and the exterior of the bonnet 212 such that one end of the gas supply port 284 opens into the bore 216 and the other end opens exteriorly of the control valve 210. The end of the gas supply port 284 opening into the bore 216 may be positioned, in the axial direction, between the first packing ring set 234 and the second packing ring set 244. A pressurized gas canister 280 is mounted to the exterior of the bonnet 280 and includes a discharge nozzle 282 positioned within the gas supply port 84. The pressurized gas canister 280 supplies pressurized gas to the bore 216 to create a gas blanket or curtain that inhibits fugitive emissions of the process fluid or gas in a manner similar to the pressurized gas canister 80 discussed above. The foregoing description of the various implementations of the pressurized gas supply of the FIG. 1 embodiment applies equally to the FIG. 2 embodiment.

Figure 3:
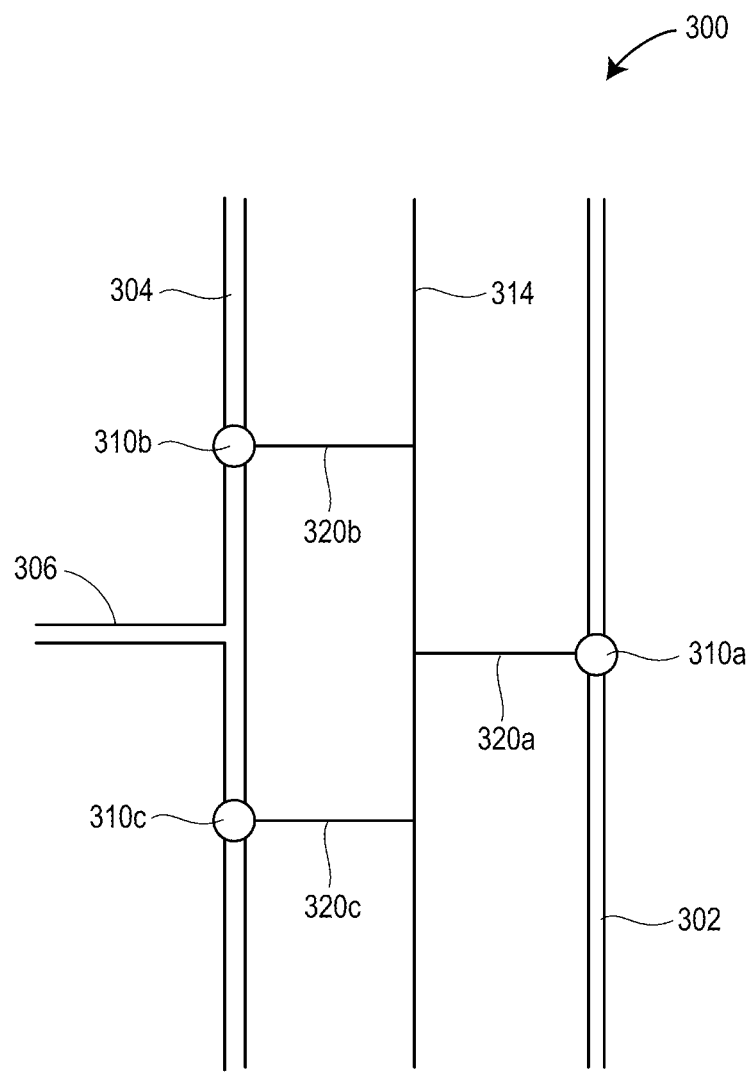
FIG. 3 is a schematic diagram of a control valve system constructed in accordance with principles of the present disclosure.

FIG. 3 depicts a low fugitive emission control valve system 300 constructed in accordance with principles of the present disclosure. The low fugitive emission control valve system 300 includes a pipeline 302 for conveying a first process fluid or gas, and pipelines 304, 306 for conveying a second process fluid or gas. A control valve 310a is positioned along the pipeline 302, and two control valves 310b, 310c are positioned along the pipeline 304. The control valves 310a, 310b, 310c may include features similar to the control valve 10 and/or the control valve 210 described above. The control valves 310a, 310b, 310c each possess a gas supply port enabling the pressurization of the bore 216 to inhibit fugitive emissions. Each of the control valves 310a, 310b, 310c is supplied with pressurized gas from a pressurized gas supply line 314. Branch lines 320a, 320b, 320c respectively connect the gas supply ports of each of the control valves 310a, 310b, 310c to the pressurized gas supply line 314. In this manner, each of the control valves 310a, 310b, 310c may be pressurized with a single source of pressurized air. The low fugitive emission control valve system 300 can utilize the main air supply of an industrial facility to pressurize the control 310a, 310b, 310c. Accordingly, the low fugitive emission control valve system 300 may be employed in a pre-existing infrastructure, thus saving installation costs. Additionally, the use of a pressurized air supply line eliminates the replacement costs associates with pressurized air canisters.

While the gas pressurized packing arrangement has been described in connection with a control valve, the scope of the present disclosure is not limited to this implementation. Any device including a sealed movable operating member or shaft can incorporate the gas pressurized packing arrangement of the present disclosure. In one embodiment, the gas pressurized packing arrangement is implemented to seal the shaft of a reciprocating pump.

While the present disclosure has been described with respect to certain embodiments, it will be understood that variations may be made thereto that are still within the scope of the appended claims.

What is claimed is:

1. A low fugitive emission control valve comprising:
   a valve body including an inlet, an outlet and a flow passage extending between the inlet and the outlet;
   a bonnet mounted to the valve body and having a bore that opens into the valve body;
   an operating member extending through the bore and operatively connected to a control member arranged in the flow passage, the operating member being configured to move the control member between a closed position and an open position to open and close the flow passage;
   a first packing member arranged in the bore about a lower portion of the operating member, the first packing member including a first plurality of packing rings having a V-shaped cross-section pointing in a downward direction;
   a second packing member arranged in the bore about an upper portion of the operating member, the second packing member including a second plurality of packing rings having a V-shaped cross-section pointing in an upward direction;
   a packing follower extending into the bore and operable to adjust a compressive load applied to at least the second packing member;
   a spring configured to bias the packing follower in the downward direction toward the second packing member;

a gas supply port extending through the bonnet and opening into the bore at a location between the first packing member and the second packing member; and a pressurized gas supply configured to pressurize the bore via the gas supply port to inhibit fugitive emissions.

2. The low fugitive emission control valve of claim 1, a pressure of the pressurized gas supply being greater than or equal to a pressure of a process fluid or gas in the flow passage.

3. The low fugitive emission control valve of claim 1, comprising a check valve arranged in the gas supply port.

4. The low fugitive emission control valve of claim 3, the pressurized gas supply including a pressurized gas canister connected to the check valve.

5. The low fugitive emission control valve of claim 1, the pressurized gas supply including a pressurized gas supply line that delivers pressurized gas from an external source.

6. The low fugitive emission control valve of claim 1, comprising a lantern ring arranged in the bore about a middle portion of the operating member between the first packing member and the second packing member.

7. The low fugitive emission control valve of claim 6, a middle portion of the lantern ring having a reduced diameter, and the gas supply port being aligned with the middle portion of the lantern ring.

8. The low fugitive emission control valve of claim 1, the operating member including a valve stem slidable along an axis of the bore to move the control member between the open position and the closed position.

9. The low fugitive emission control valve of claim 1, the operating member including a rotatable shaft to move the control member between the open position and the closed position.

10. A gas pressurized packing system for use in a control valve including a valve body with a flow passage, the gas pressurized packing system comprising:
    a bonnet configured for connection to the valve body;
    a bore extending through the bonnet and configured to open into the valve body;
    an operating member extending through the bore and configured for connection to a control member arranged in the flow passage;
    a first packing member configured to be arranged in the bore about a lower portion of the operating member, the first packing member including a first plurality of packing rings having a V-shaped cross-section pointing in a downward direction;
    a second packing member configured to be arranged in the bore about an upper portion of the operating member, the second packing member including a second plurality of packing rings having a V-shaped cross-section pointing in an upward direction;
    a packing follower configured to extend into the bore and operable to adjust a compressive load applied to at least the second packing member;
    a spring configured to bias the packing follower in the downward direction toward the second packing member; and
    a pressurized gas supply configured to pressurize a portion of the bore arranged between the first packing member and the second packing member.

11. The packing system of claim 10, a pressure of the pressurized gas supply being greater than or equal to a pressure of a process fluid or gas in the flow passage.

12. The packing system of claim 10, the pressurized gas supply including a pressurized gas canister.

13. The packing system of claim 10, comprising a lantern ring configured to be arranged in the bore about a middle portion of the operating member between the first packing member and the second packing member.

14. A low fugitive emission control valve system comprising:
    a plurality of control valves, each of the control valves including:
        a valve body including an inlet, an outlet and a flow passage extending between the inlet and the outlet;
        a bonnet mounted to the valve body and having a bore that opens into the valve body;
        an operating member extending through the bore and operatively connected to a control member arranged in the flow passage, the operating member being configured to move the control member between a closed position and an open position to open and close the flow passage;
        a first packing member arranged in the bore about a lower portion of the operating member, the first packing member including a first plurality of packing rings having a V-shaped cross-section pointing in a downward direction;
        a second packing member arranged in the bore about an upper portion of the operating member, the second packing member including a second plurality of packing rings having a V-shaped cross-section pointing in an upward direction;
        a packing follower extending into the bore and operable to adjust a compressive load applied to at least the second packing member;
        a spring configured to bias the packing follower in the downward direction toward the second packing member; and
        a gas supply port extending through the bonnet and opening into the bore at a location between the first packing member and the second packing member; and
    a pressurized gas supply line configured to pressurize the bores of the control valves via the respective gas supply ports.

15. The low fugitive emission control valve system of claim 14, a pressure of the pressurized gas supply being greater than or equal to a pressure of a process fluid or gas in the flow passages of each of the control valves.

* * * * *

UNITED STATES PATENT AND TRADEMARK OFFICE
CERTIFICATE OF CORRECTION

PATENT NO. : 9,528,631 B2  
APPLICATION NO. : 14/519603  
DATED : December 27, 2016  
INVENTOR(S) : Michael Wildie McCarty Page 1 of 1

It is certified that error appears in the above-identified patent and that said Letters Patent is hereby corrected as shown below:

On the Title Page

At item (73), Line 3, "Marshaltown," should be -- Marshalltown, --.

Signed and Sealed this  
Twenty-seventh Day of March, 2018

Andrei Iancu  
*Director of the United States Patent and Trademark Office*